B. T. BURCHARDI & B. E. TEALE.
CIGARETTE WRAPPING AND TUCKING MACHINE.
APPLICATION FILED JULY 15, 1912.
1,134,438. Patented Apr. 6, 1915.
12 SHEETS—SHEET 3.
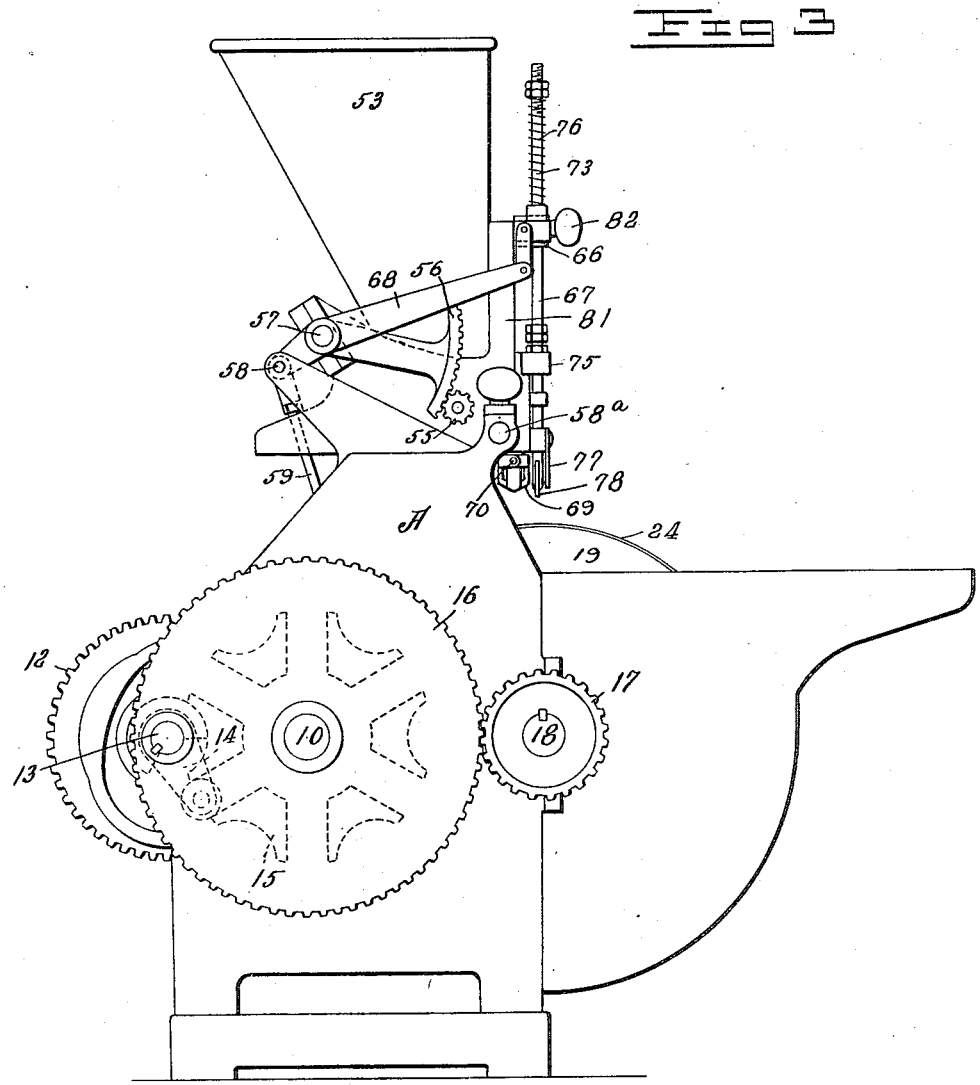

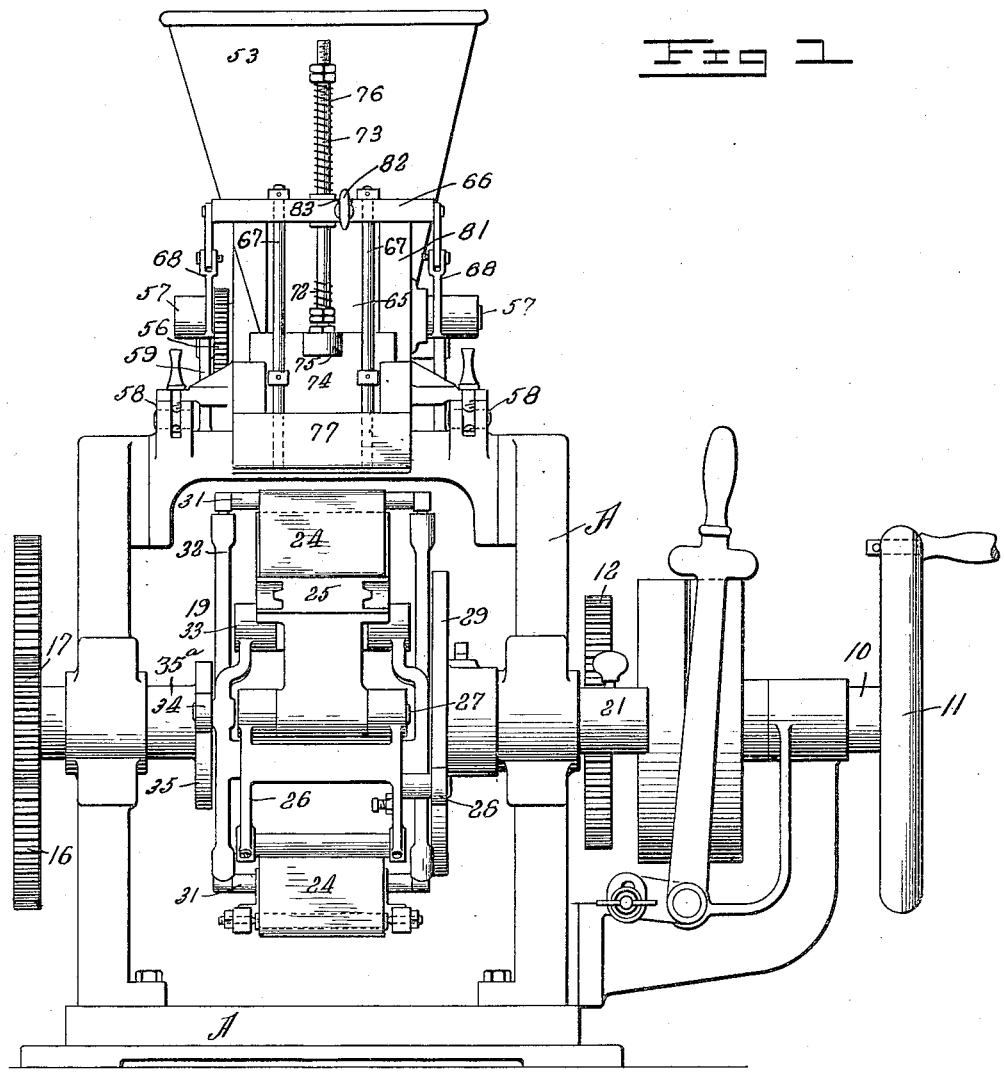

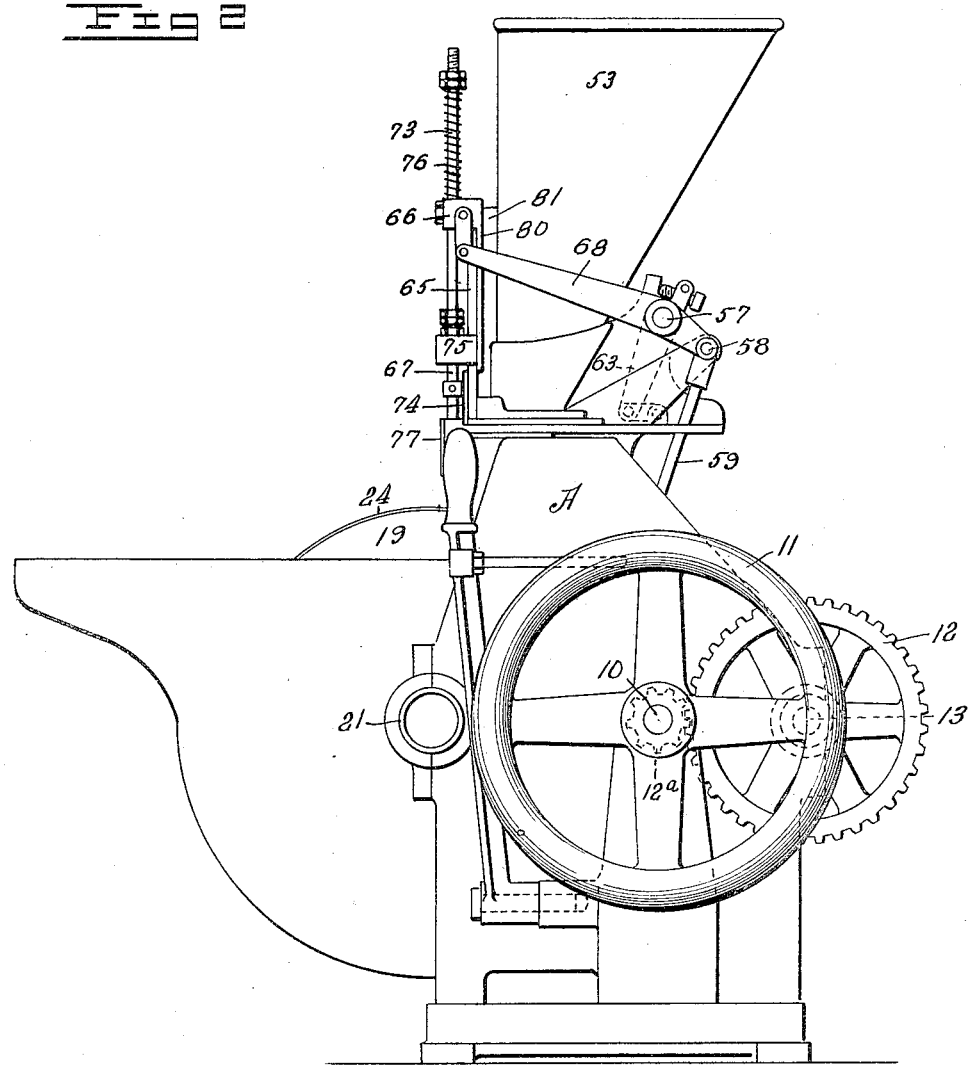

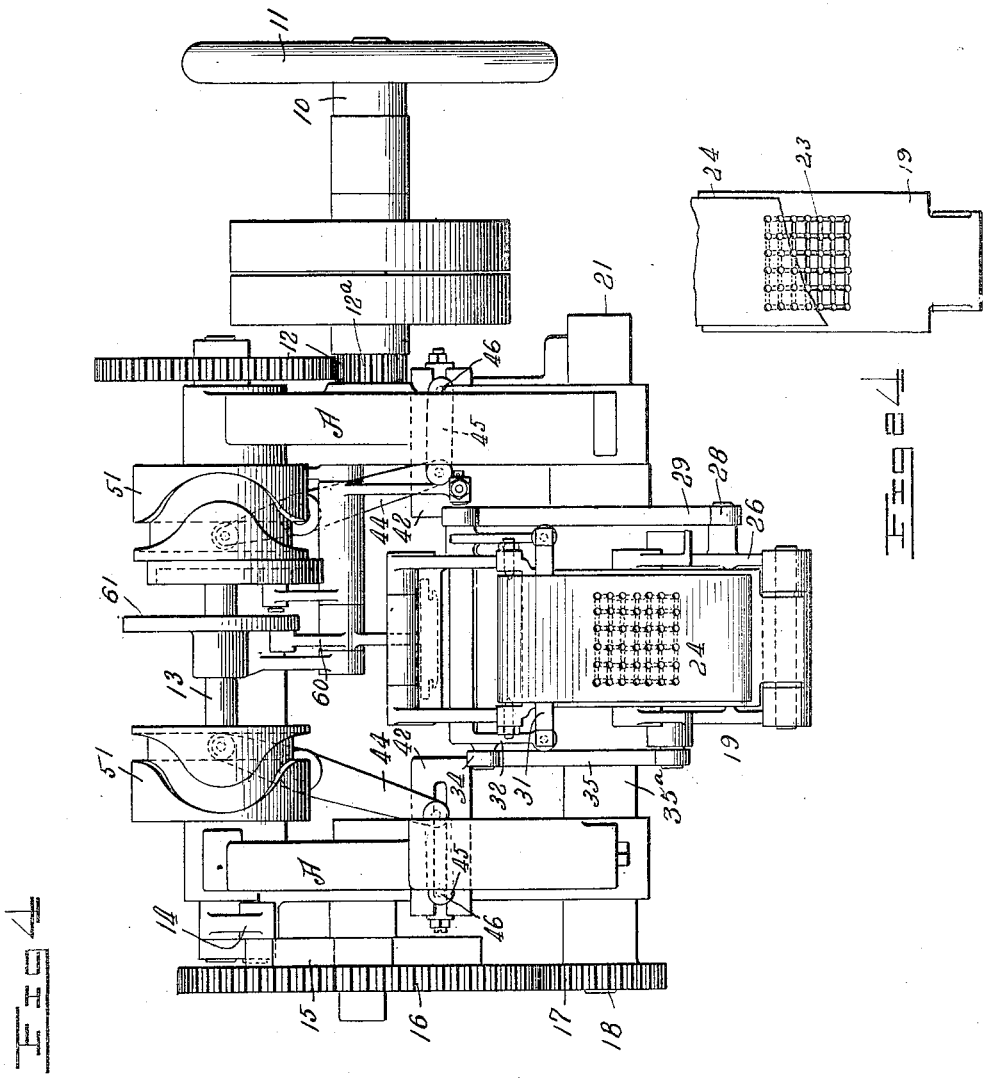

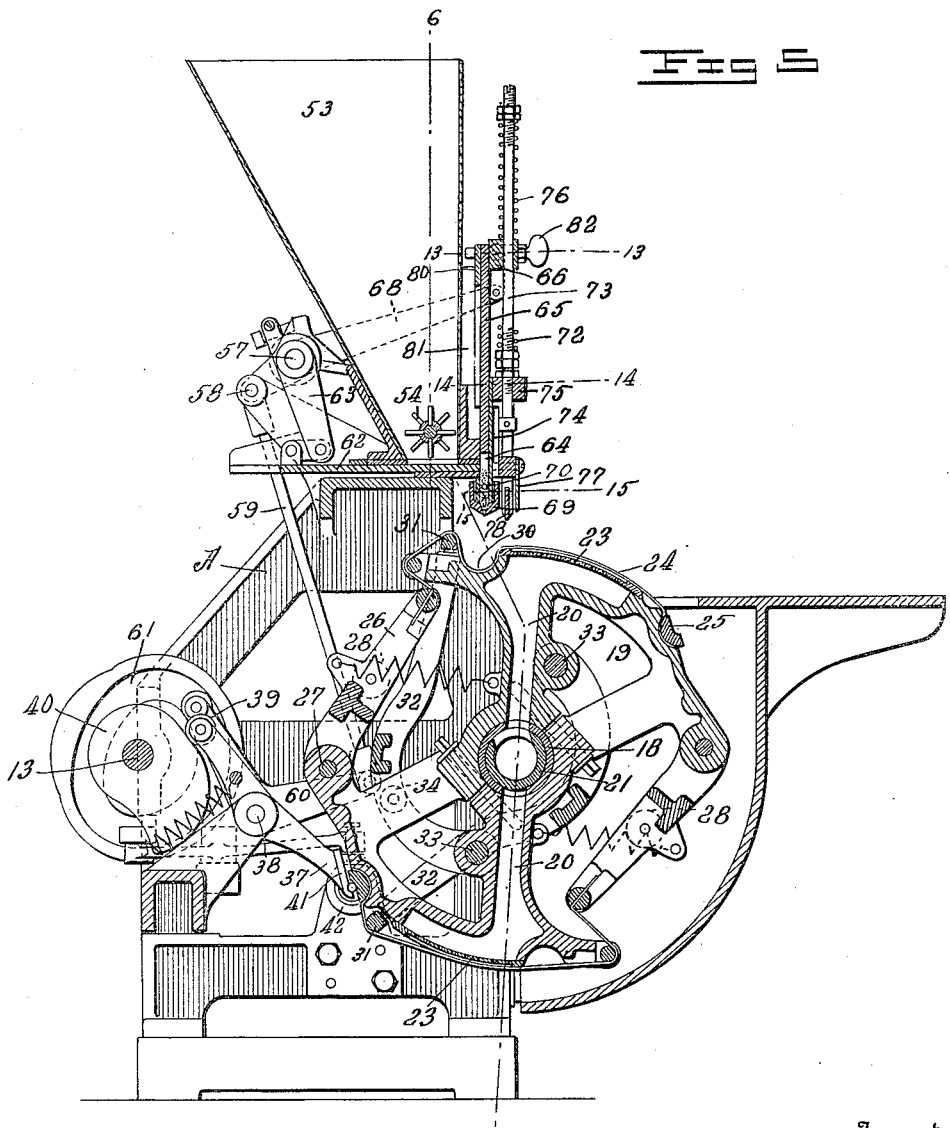

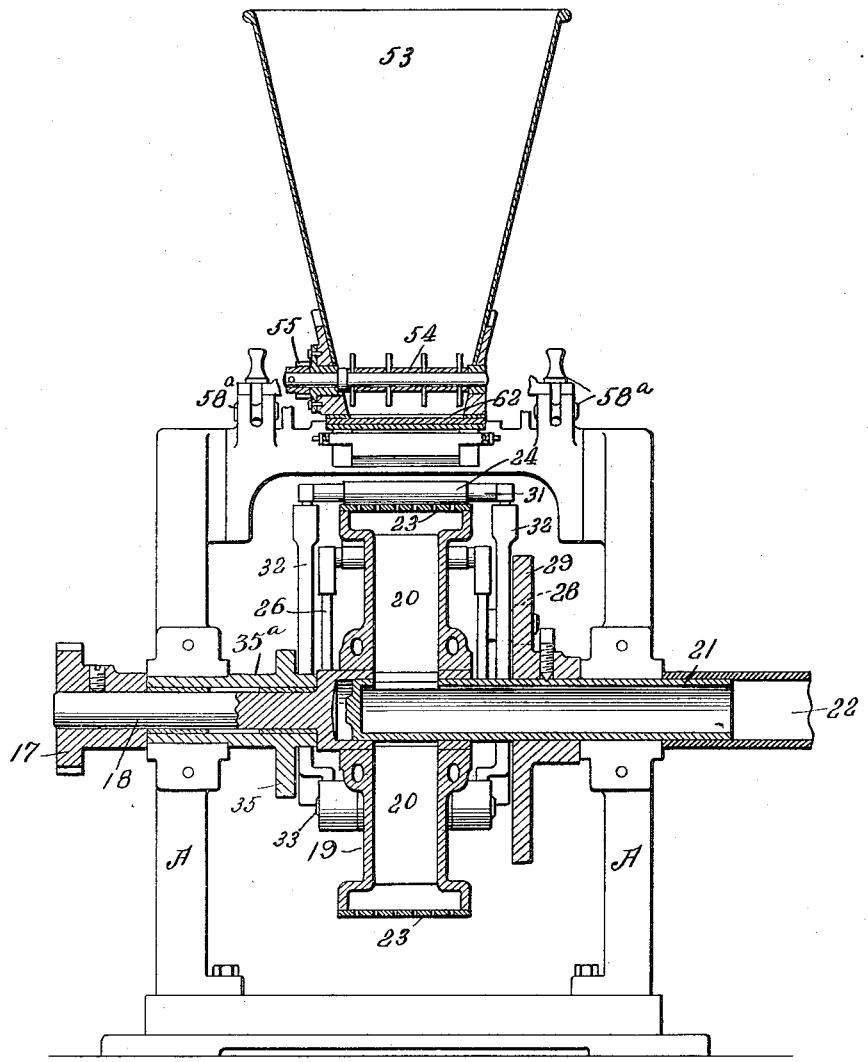

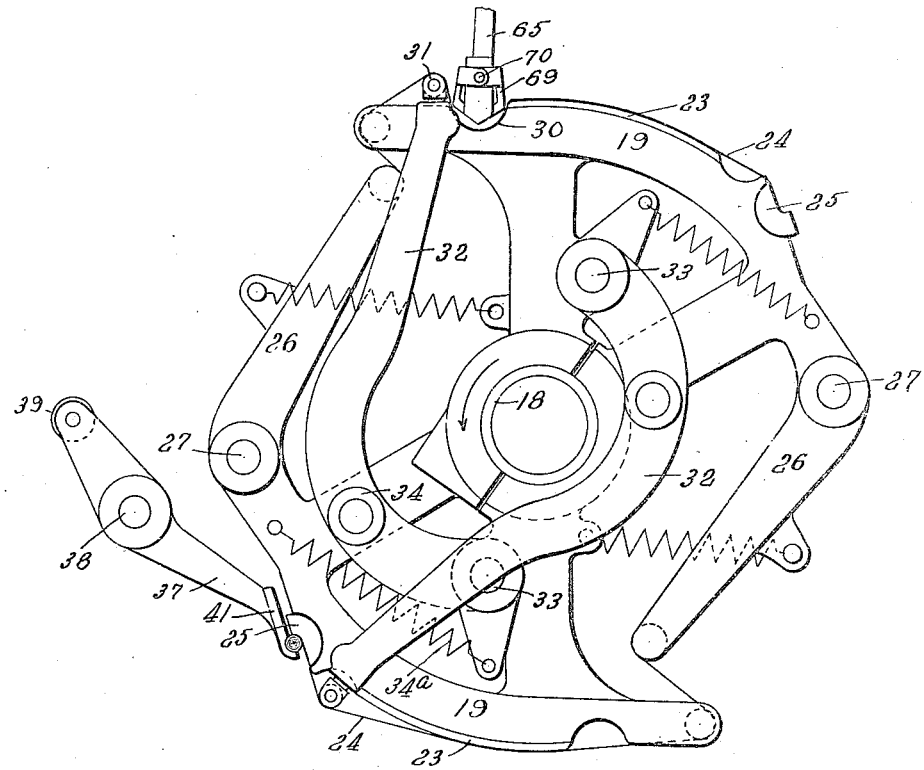
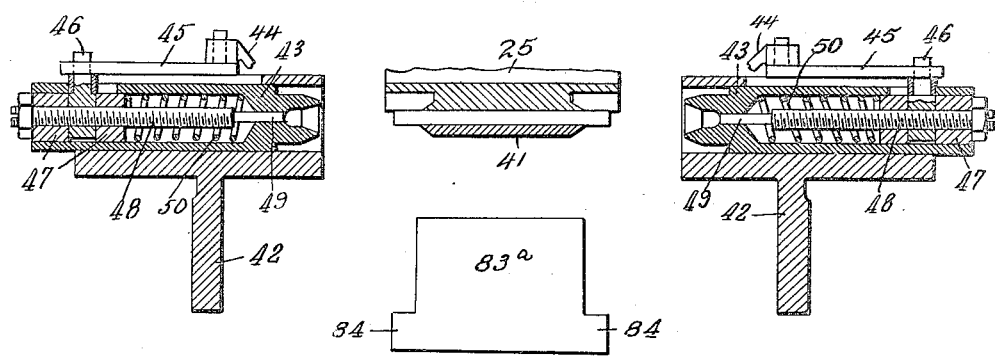

B. T. BURCHARDI & B. E. TEALE.
CIGARETTE WRAPPING AND TUCKING MACHINE.
APPLICATION FILED JULY 15, 1912.
1,134,438.
Patented Apr. 6, 1915.
12 SHEETS—SHEET 8.
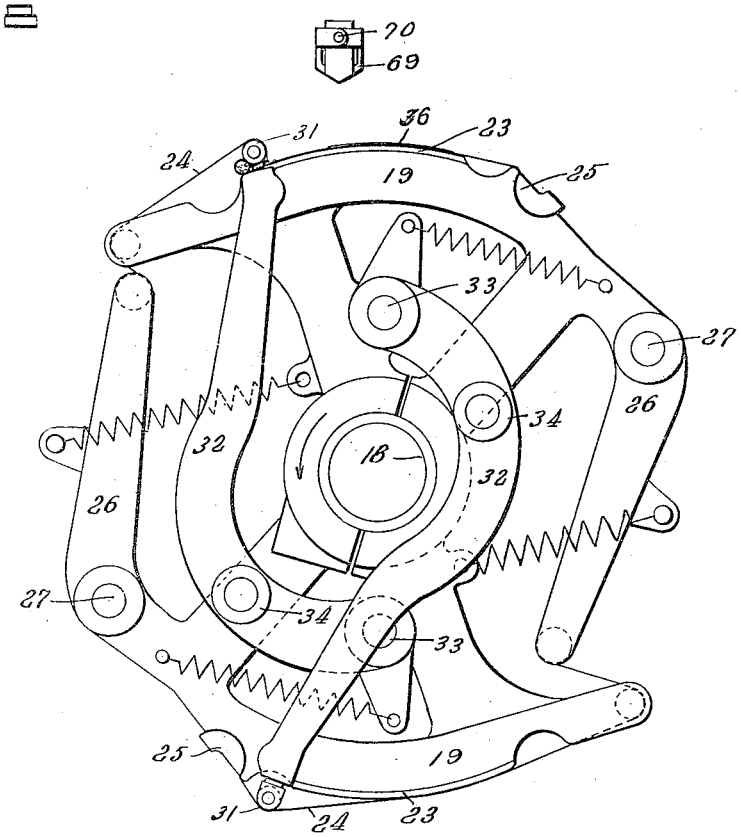
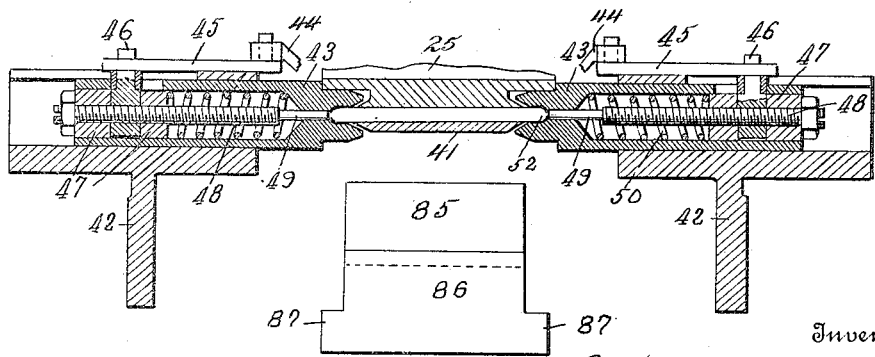

B. T. BURCHARDI & B. E. TEALE.
CIGARETTE WRAPPING AND TUCKING MACHINE.
APPLICATION FILED JULY 15, 1912.
1,134,438.
Patented Apr. 6, 1915.
12 SHEETS—SHEET 9.
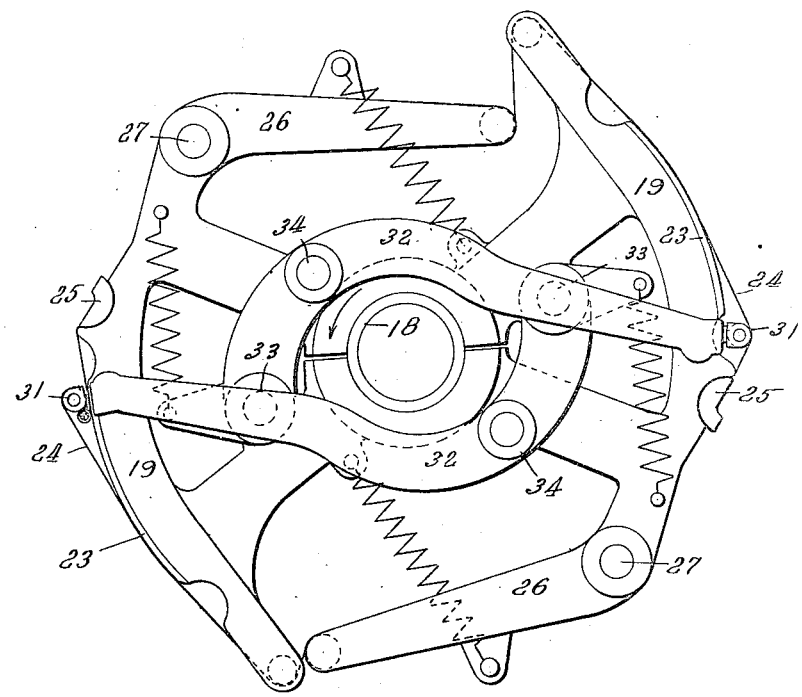
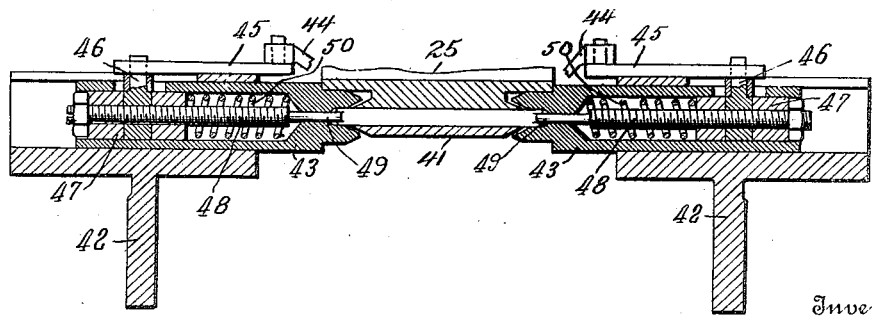

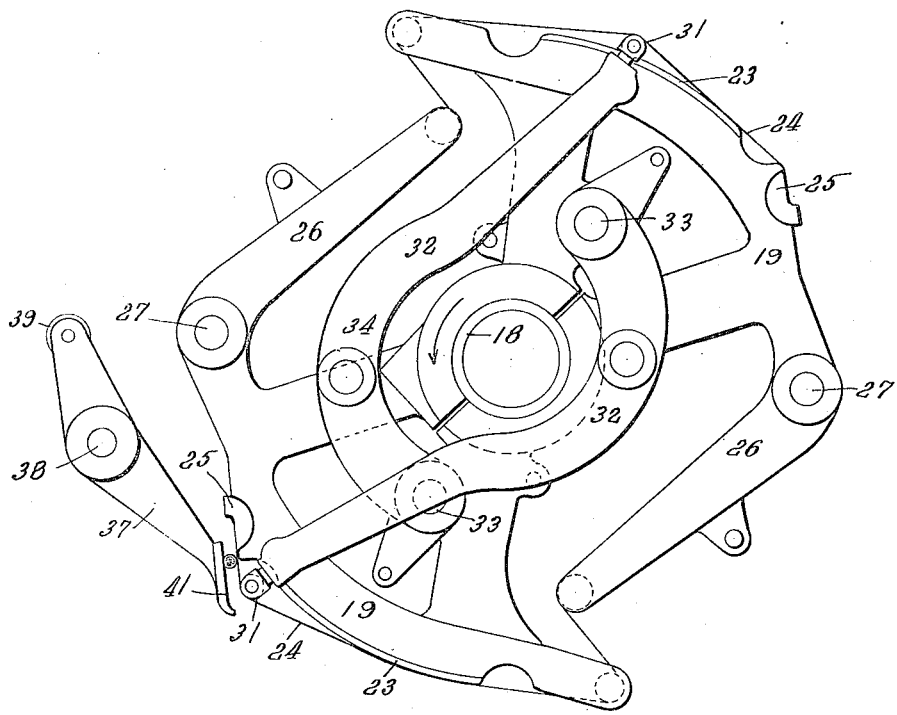

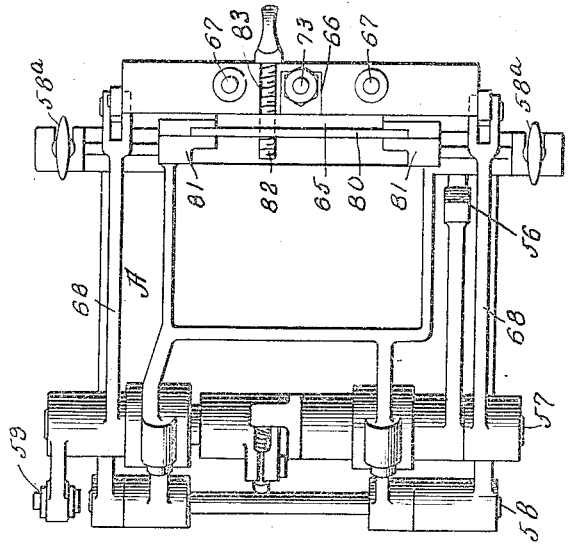
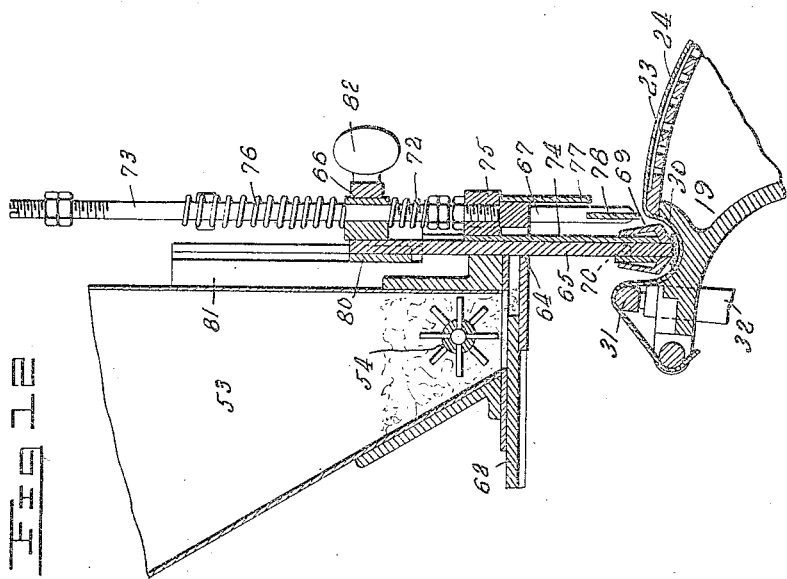

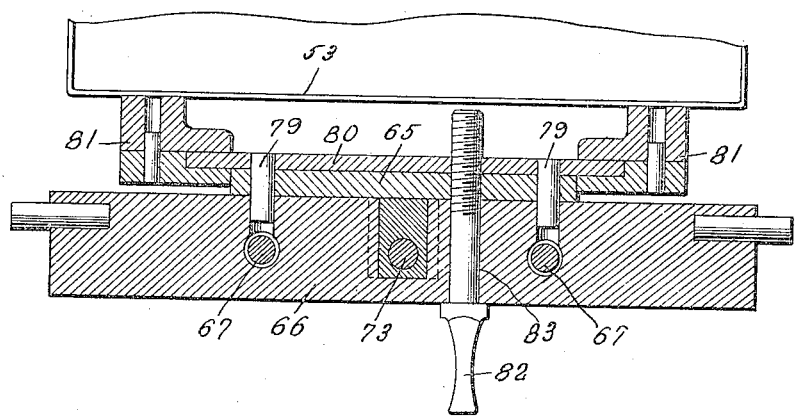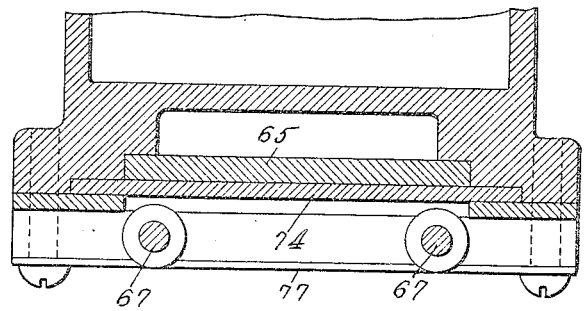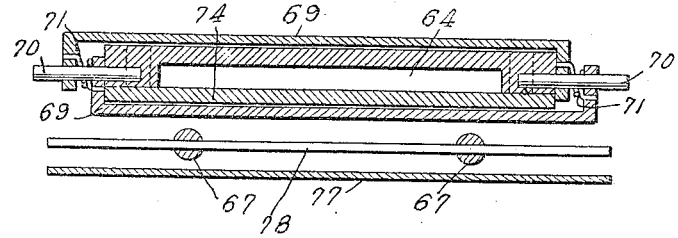

UNITED STATES PATENT OFFICE.

BERNHARD T. BURCHARDI AND BENJAMIN E. TEALE, OF BROOKLYN, NEW YORK.

CIGARETTE WRAPPING AND TUCKING MACHINE.

1,134,438.  Specification of Letters Patent.  Patented Apr. 6, 1915.

Application filed July 15, 1912.  Serial No. 709,530.

*To all whom it may concern:*

Be it known that we, BERNHARD T. BURCHARDI and BENJAMIN E. TEALE, citizens of the United States, residing at Brooklyn, in the county of Kings and State of New York, have invented new and useful Improvements in Cigarette Wrapping and Tucking Machines, of which the following is a specification.

The present invention relates to machines for making cigarettes, and is designed particularly for making cigarettes having end-tucked wrappers, a good example of which is the Mexican cigarette, in which the wrapper is formed of corn shuck, and is rolled about the charge of tobacco, the ends being then tucked to secure the wrapper in place, it being customary in using these cigarettes, according to the native way of smoking them, to loosen the tucked ends, unroll, at least partially, the cigarette, and then reroll it prior to smoking. In some instances in making these shuck cigarettes, the cigarette formed of corn shuck is inclosed in a paper wrapper, the ends of which are tucked to maintain the inclosed shuck cigarette in proper form, and the present machine is designed for rolling these cigarettes, either signed for rolling these cigarettes, either when made with the exterior paper envelop or wrapper.

While the machine, as stated, is intended primarily to handle shuck cigarettes of the type mentioned, it will be understood that it is not limited to this particular type of cigarette, but is useful whenever rolled cigarettes, as distinguished from the continuous rod cigarettes, are to be made, regardless of the particular wrapper which may be adopted.

In order that the invention may be clear to those skilled in the art, it is illustrated in the accompanying drawings, and in said drawings:

Figure 1 is a view of a machine in end elevation embodying this invention. Fig. 2 is a view in side elevation, looking from the right of Fig. 1. Fig. 3 is a view in side elevation, looking from the left of Fig. 1. Fig. 4 is a plan view of the machine, the hopper and charge forming devices being removed in order to illustrate the mechanisms below. Fig. 5 is a vertical sectional view of the machine, showing the charge forming devices, and the wrapping drum and its associated parts. Fig. 6 is a sectional view on substantially the line 6—6 of Fig. 5, to show the wrapping drum and the suction box. Figs. 7, 8, 9 and 10 are views in side elevation of the wrapping drum apart from the machine to show the several positions of the wrapping instrumentalities as they progress from the initial charge receiving position to the final cigarette delivering position. Fig. 11 is a detail plan view of the hopper and charge forming devices. Fig. 12 is a sectional view through the hopper and charge forming devices. Fig. 13 is a sectional view on substantially the line 13—13 of Fig. 5. Fig. 14 is a sectional view on substantially the line 14—14 of Fig. 5. Fig. 15 is a sectional view on substantially the line 15—15 of Fig. 5, showing the charge receiving gates and the related parts. Figs. 16, 17, 18, and 19 are detail sectional views of the end tucking instrumentalities. Figs. 20 and 21 are detail diagrammatic views of the rolling apron in two different positions relative to the charge and wrapper. Figs. 22 and 23 are conventional views of the wrappers which may be used in conjunction with the wrapping and tucking mechanisms shown. Fig. 24 is a detail plan view of the wrapping drum, to show the surface of the suction area.

Referring to the drawings by reference characters, like characters indicating like parts in the several views, A indicates the frame of the machine and in which the moving parts are supported, which frame may be of any suitable design, in the present case being shown as comprising a bed, side frames, and supporting table, the moving parts of the machine being mainly housed within the side frames and an extended housing for protection of the machine parts and safety of operators.

Mounted in suitable bearings in the frame A is a drive shaft 10 having hand wheel 11, and the usual fast and loose pulleys, as best shown in Figs. 1 and 4. The said drive shaft by means of pinion 12ª and gear wheel 12 drives a cam shaft 13 mounted in suitable bearings on the machine frame, said shaft 13 being provided with a series of operating cams so arranged and timed as to impart the proper movements to the various instrumentalities, as will be hereinafter set forth.

The said cam shaft 13 is extended, as shown in Figs. 3 and 4, and its extended end is provided with the crank or tappet arm 14 of a Geneva movement, which tappet engages the slots of the segmental wheel 15, the gear wheel 15 of which segment drives a pinion 17 on a counter-shaft 18 on which is mounted the wrapping drum 19, said shaft 18 being mounted in bearings in one of the side frames of the machine, (see Fig. 6). The said wrapping drum is provided with suction conduits 20 extending from its center to its circumference, said suction conduits, as shown in Figs. 5 and 6, communicating, in certain angular positions, with a fixed hollow shaft 21 mounted in a suitable bearing in one of the side frames of the machine; and, as best shown in Fig. 6, entering the bore of the shaft 18 and supporting it, the outer end of this hollow shaft 21 being coupled to any suitable suction conduit 22. The wrapper drum 19 will, it is obvious, be intermittently rotated as the machine is driven, through the Geneva movement just described, the parts being so timed as to bring the wrapper or shuck receiving areas of the drum, presently to be described, up to charge-receiving position beneath the charge forming and delivering devices, and then permit a dwell of the machine during a deposit of the charge on the shuck or wrapper.

The shuck receiving areas, of which two are shown in the present instance, comprise perforated sections 23 overlying suction chambers which communicate with the conduits 20 leading to the tubular shaft 21 heretofore described, the suction mouth of the shaft 21 being so adjusted as that the conduit 20, its chamber, and the suction areas 23 will be exhausted at that point in the angular travel of the wrapping drum just prior to the deposit of the charge on the shuck, as best shown in Fig. 5. The suction area 23 of the wrapping drum is not only perforated, but grooved between perforations, as shown in Fig. 24 to insure proper suction through the wrapping belt; and said suction area is overlaid by a perforated wrapping belt 24, said belt 24 having one end clamped by a clamp rod 25 to the face of the wrapping drum, its outer end being suitably secured to arms 26 pivoted at 27 in suitable bearings on the wrapping drum, the said pivoted arms 26 carrying a roll 28 adapted to engage as the drum rotates with a fixed cam 29 carried by the machine frame, a spring connecting the arms with the drum serving to maintain the parts in their initial positions, as shown in Fig. 7. The length of the apron 24 is such that in its normal position there is sufficient slack to form a charge receiving pocket 30 which lies in a suitable groove or depression in the wrapping drum face, as shown in Fig. 5, in which position the forming apron is ready to receive a charge of tobacco. In this position of the machine, it will be observed that the upper area 23 is under suction, and the operator lays a wrapper upon the perforated belt 24 in proper position, which wrapper by reason of the suction is held snugly and smoothly to the wrapping belt 24. As the wrapping drum 19 advances from the position shown in Figs. 5 and 7, a bight forming roller 31 carried by arms 32 pivoted at 33 on the wrapping drum will take the position shown in Fig. 8, and throw a loop or bight of the belt about the charge of tobacco to initiate bunching and rolling. The said bight forming or stretching arms 32 are provided with a cam roller 34 adapted to engage a fixed cam 35 secured to the hollow shaft 35$^a$ to impart the requisite stretching movement to the belt, a spring 34$^a$ being provided to maintain normally the stretching arms 32 in the initial position shown in Fig. 7, the spring being secured to the wrapping drum at one end, and at the other end to the arm 32. On reference to Fig. 8 it will be seen that the shuck 36 (diagrammatically illustrated), and the bight forming rollers will move toward each other, and, simultaneously with nipping the forward end of the shuck or wrapper 36 in the bight of the apron, the wrapping drum 19 will have passed the suction slot or mouth of the tubular shaft 21, and the shuck or wrapper will be released from suction, and by the continued action of the wrapping apron drawn in and wrapped about the rolled charge, this wrapping action continuing through the position shown in Fig. 9 to the position shown in Fig. 10, where the wrapping is completed, and the cigarette is released from the bight of the wrapping apron.

As the drum rotates, the levers controlling the stretching or bunching apron pass from the initial position shown in Fig. 7, in which the charge to be wrapped is shown as being deposited by the charge forming and depositing devices, to be hereinafter described, through the several positions shown in Figs. 8, 9 and 10, the action of the stretching roller 31 on the charge of tobacco being diagrammatically illustrated in Figs. 20 and 21. The result of this bunching or rolling action as the drum progresses is to compact the charge deposited on the apron, roll the same into cigarette form, and wrap the shuck 36 about it. When the drum has advanced to the point shown in Fig. 10, the apron controlling instrumentalities take up the slack in the apron so as to straighten it, release the cigarette from the roller bight, and at that stage the cigarette is caught by the retaining arm 37, pivoted at 38 to a bracket on the machine frame, said retaining arm having a cam roll 39 engaging a cam 40 on the cam shaft 13, the parts being so timed as that the retaining arm will be thrown forward to engage the cigarette just as the drum reaches the stage where the rolling operation is completed. The said retaining arm has a clamping foot 41 with an extended surface along which the cigarette is rolled until, as best shown in Fig. 5, it is held in the seat formed by the clamping rod 25 and the said retaining foot 41, at which point a dwell in the rotation of the drum occurs, and during this dwell the tucking of the cigarette or wrapper is effected by means of instrumentalities which will now be described, particular reference being had to Figs. 4, 5, 16, 17, 18 and 19.

The tucking instrumentalities are mounted on brackets 42 suitably secured to the machine frame, and comprise tucking heads 43 slidingly mounted in the brackets, and designed to be actuated by cam levers 44 linked by the link connections 45 to studs 46 held between blocks 47, which are in turn mounted on screw rods 48 placed centrally of the tucking heads 43. The tucking heads are hollow, and the screw rod 48 has the tucking plunger 49 at its forward end, a spring 50 being interposed between the tucking heads 43 and inner plate 47 so as to permit of relative movement between the tucking head and the plunger 49.

The cam levers 44 are actuated by grooved cams 51, best shown in Fig. 4, mounted on the shaft 13, the cams being so plotted as to give the tucking thrust to the tucking mechanism at the moment of dwell of the drum with the rolled cigarette beween the retaining arm 41 and the belt clamp 25 on the drum, as illustrated in Figs. 5 and 7.

The first action of the tucking mechanism as it is thrust forward by the operating levers 44 is to advance the tucking heads 43, which are coned at their ends, and have inclined or coned apertures, until the coned ends of the heads 43 engage complementary seats formed in the ends of the clamping rod 25 which serve to center the drum and correct any inaccuracies in its angular position, all as shown in Fig. 17. Simultaneously the coned seats in the tucking heads 43 embrace the protruding shuck ends, as indicated at 52 Fig. 17, turning in such shuck ends to a position where they may be readily engaged and tucked by the tucking plunger 49, as clearly shown in Fig. 18, which illustrates the last step of the tucking operation, and from which illustration it will be apparent that after the tucking heads 43 have made their forward thrust, the rods 48 and tucking plungers 49 will continue their movement, the stud 46 moving in the slot in the tucking head barrel, projecting the plungers 49 against the crimped over shuck ends, and thrusting these ends inwardly in tucked formation into the ends of the cigarette. The tucking heads will thereafter, by the continued movement of the actuating cams and cam levers, be retracted, and the drum being again actuated, the rolled and tucked cigarettes will be dropped from between the retaining foot 41 and the clamping rod 25 into a suitable receptacle. It will be understood that various types of end tucks may be made without departing from the principle of the invention, by merely modifying the tucking heads to meet the requirement of the particular tuck to be made.

It will be apparent, of course, that the forming, wrapping and tucking mechanisms just described may be provided with any suitable charging mechanism, and one suitable type of charging mechanism is herein illustrated, reference being had particularly to Figs. 1 to 3 inclusive, 5, 6, and 12 to 15 inclusive.

The charging mechanism comprises the feed hopper 53, of any desired capacity, having therein near its bottom an agitator wheel 54 which is oscillated by means of the pinion 55 and drive segment 56, said segment being mounted on an oscillating shaft 57 mounted in suitable bearings in the frame work of the hopper, the hopper and all its associated parts being pivoted at 58 to suitable bracket arms rising from the main frame of the machine, so that the hopper and its contained mechanism may be tilted back for the purpose of inspection, adjustment, or repair; suitable thumb screws 58ª being provided to engage a slotted bar on the front of the hopper and lock it in place. The said shaft 57 is rocked in its bearings by means of the connecting rod 59 which is coupled at its lower end with a cam lever 60, said cam lever having a roll which engages the cam 61 on the cam shaft 13, said cam 61 being so plotted as to give an oscillation to the shaft 57 at every half turn of the wrapping drum, so as to effect delivery of a charge of tobacco twice on every revolution of said wrapping drum, although it will be obvious that the timing of this operating mechanism will be changed to meet the demands of the wrapping drum if it should so happen that the drum was designed to wrap more than two cigarettes in one cycle.

To effect the feeding of a charge from the hopper when the rock shaft 57 is oscillated as described, a horizontal feed slide 62 is provided, said slide being mounted in suitable ways below the hopper, and coupled to the rock shaft 57 by the crank arm 63 linked to a suitable stud on the slide 62. At each forward thrust of the slide the quantity of tobacco necessary to furnish a charge will be carried forward from the hopper to the chute 64, which chute is traversed by the vertical slide 65 (see Fig. 5) mounted in suitable ways, and carried by the rising and falling cross head 66 guided by the rods 67 secured to the bottom-plate of the hopper. The said cross head 66 is connected by link connections with a crank arm 68 mounted on the rock shaft 57 which lays at substantially right angles to the crank arms 68 for operating the horizontal slide 62, so as to alternate the movement of said horizontal and vertical slides.

At the lower end of the chute 64 are gates 69 carried by supporting pins 70, and normally held in closed position by springs 71 so as to effectually close the bottom of the chute. As the cross head 66 moves downwardly, driving the plunger 65 down the chute and carrying the charge of tobacco therein forward, it compresses the charge downwardly in the lower end of the chute against the gates, and as its movement continues the said cross head strikes the spring 72 carried by the suspending rod 73 which supports the gates and their carrier plate 74, said carrier plate being secured to the block 75 mounted on the rod 73, a spring 76 serving normally to hold the block 75 and its supported parts in elevated position, as shown in Fig. 5. It will be seen, therefore, that the vertical plunger 65 makes an initial charge-forming and compressing movement, and that the said plunger, gates, and the gate carrier head continue their downward movement to the position shown in Fig. 12, at which point the plunger 65 will be still further projected, the cross head 66 compressing the spring 72 and forcing the gates apart and the charge of tobacco into the belt pocket, as shown.

In order to properly protect the operators from being caught by the downwardly moving charge delivering devices, I preferably locate directly in front of the pocket a fixed apron 77 (see Fig. 12), and I span the lower ends of the guide rods 67 with a movable apron 78, which, as the parts move downwardly, is shifted from the position shown in Fig. 5 to that shown in Fig. 12, effectually closing the opening between the hopper and the drum, and the parts are so timed as that the apron 78 descends to its guard position just ahead of the descending slide gate head.

The mechanism just described may be conveniently assembled as shown in Figs. 13, 14 and 15, the head 66 and the plunger 65 being coupled by dowel pins 79 fixed in the carrier plate 80 which slides in the brackets 81 secured to the front of the hopper, these parts being held in proper place by means of the thumb screw 82 which passes through the head 66, plunger 65, and carrier plate 80, so as to hold them in assembled condition, and preferably this thumb screw 82 will lie in an open slot 83 on top of the cross head 66, so that on loosening the thumb screw 82 the plunger and its associated parts may be removed from the guide plates.

The operation of the machine has been set forth in describing the several mechanisms, and it is believed that the same will be clear without repeating the entire action of the machine.

As described the mechanism is capable of effectually feeding, rolling, and tucking individual cigarettes, and particularly shuck cigarettes, these shucks being conventionally illustrated in Figs. 22 and 23, in which 83ª represents substantially the form of a shuck wrapper where the paper wrapper is not used, this wrapper, as shown in Fig. 22, being of rectangular form with tucking tabs 84 at one end. This wrapper is fed with the untabbed end first inserted, and the charge of tobacco is rolled in the body of the cigarette, as described, leaving the tucking tabs rolled and projecting so as to form tuck-in ends on which the tucking heads heretofore described operate.

In the form shown in Fig. 23 the shuck wrapper 85 is rectangular, as shown, and is not provided with tucking tabs, the outer paper wrapper 86 being lapped upon the shuck 85 and provided with tucking ends 87. With this form of wrapper the tobacco will be completely inclosed in the shuck during wrapping, and the inclosing paper wrapper will then be laid about the shuck cigarette with the tucking tabs protruding in rolled form at either end, which paper tabs when tucked will serve to hold the cigarette in form, it being understood that this outer paper wrapper is removed for smoking, leaving the untucked shuck cigarette for re-rolling and use.

While a particular mechanism has been illustrated and described herein, it will be understood that the constructions may be varied within the range of mechanical skill without departing from the invention, and all such changes as are mere mechanical expedients in lieu of those disclosed are to be regarded as within the purview of this invention.

We claim:—

1. In a machine of the class described and in combination, a traveling wrapping carrier having a suction area, a pervious wrapper-receiving and retaining belt overlying said suction area and moving with said carrier into position to receive a charge of tobacco, and belt-manipulating instrumentalities on the carrier operative to roll a suction-held wrapper and a charge of tobacco into a cigarette.

2. In a machine of the class described and in combination, a traveling wrapping carrier having a suction area, a pervious wrapper-receiving and retaining belt overlying said suction area and moving with said carrier, belt-manipulating instrumentalities moving with said carrier and operative to roll a suction-held wrapper and a charge of tobacco into a cigarette, and means to tuck the ends of said cigarette on completion of the rolling operation.

3. In a machine of the class described and in combination, a traveling wrapping carrier having a suction area, a pervious wrapper-receiving and retaining belt overlying said area and moving with said carrier, means for depositing a charge of tobacco on said belt at a certain angular position of the carrier, belt manipulating instrumentalities operative to roll a suction-held wrapper and a charge of tobacco into a cigarette, and means to tuck the ends of said cigarette on completion of the rolling operation.

4. In a machine of the class described and in combination, a traveling wrapping carrier having a suction area, a pervious wrapper-receiving and retaining belt overlying said suction area and moving with said carrier, belt manipulating instrumentalities mounted on and movable with said carrier but operable independently thereof to roll a suction-held wrapper and a charge of tobacco into a cigarette, and means to tuck the ends of said cigarette on completion of the rolling operation.

5. In a machine of the class described and in combination, a traveling wrapping carrier having a plurality of spaced suction areas, means for moving the said carrier to position said areas successively in a predetermined position, wrapper-receiving and retaining belts overlying said suction areas, belt manipulating instrumentalities on and movable with said carrier but independently operative to roll a suction-held wrapper and charge of tobacco into a cigarette, and means to tuck the ends of said cigarette on completion of the rolling operation.

6. In a machine of the class described and in combination, an intermittently movable wrapping carrier having a plurality of suction areas, means for moving the said carrier to position said areas successively in a predetermined position, wrapper-receiving and retaining belts overlying said suction areas and movable with said carrier, belt-operating levers on said carrier but movable independently thereof to roll a suction-held wrapper and charge of tobacco into a cigarette, lever-operating cams adjacent the path of travel of said carrier, and means to tuck the ends of said cigarette on completion of the rolling operation.

7. In a machine of the class described and in combination, a traveling wrapping drum having an intermittently active suction area on its peripheral face, a wrapper-receiving and retaining belt overlying said area, belt manipulating instrumentalities carried by said drum but independently operative to roll a suction-held wrapper and a charge of tobacco into a cigarette, means for receiving and holding a rolled cigarette at a predetermined point in the movement of said carrier, and means for tucking the ends of said cigarette when thus held.

8. In a machine of the class described and in combination, a traveling wrapping drum having an intermittently active suction area on its peripheral face, a perforated wrapper-receiving and retaining belt moving with said drum and overlying said suction area, belt manipulating levers carried by said wrapping drum but operable independently thereof, means for actuating said levers to wrap a charge of tobacco and a suction-held wrapper into a cigarette, means for receiving and holding said rolled cigarette, and means for tucking the ends of said cigarette when thus held.

9. In a machine of the class described and in combination, a traveling wrapping drum having a plurality of intermittently active suction areas having interconnected suction ports, a perforated wrapper-receiving and retaining belt moving with said carrier and overlying said suction areas, means for depositing a charge of tobacco on said belt in advance of a wrapper, belt manipulating levers movable with said belt but operable independently thereof to roll a charge of tobacco and a suction-held wrapper into a cigarette, means for receiving and holding said cigarette when discharged from the belt, and means for tucking the ends of said cigarette when thus held.

10. In a machine of the class described and in combination, a wrapping drum having a suction area which is active upon a predetermined angular movement of the drum, a wrapper-receiving and retaining belt overlying said area, bight forming levers to manipulate said belt and roll a charge of tobacco and a suction-held wrapper into a cigarette, a retaining arm to engage a rolled cigarette against the face of said wrapping drum when said cigarette is discharged from the belt, and means for tucking the ends of said cigarette thus held.

11. In a machine of the class described and in combination, a revoluble wrapping drum having a suction area which is active during a predetermined angular position of the drum, a wrapper-receiving and retaining belt overlying said area, means for depositing a charge of tobacco on said belt in advance of a wrapper, bight forming levers mounted on said drum to manipulate said belt and roll a charge of tobacco and a suction held wrapper into a cigarette, means for operating said levers during rotation of the drum to first form the cigarette and then release it from the wrapping belt, a cigarette retaining arm to receive the rolled cigarette from said belt and hold it against the periphery of the drum, and tucking mechanism operable to tuck the ends of the cigarette when thus held.

12. In a machine of the class described and in combination, a wrapping carrier having a suction area with interconnected exhaust passages traversing its surface, and a pervious wrapping belt overlying said area to receive and retain a wrapper.

13. In a machine of the class described and in combination, a wrapping carrier having a perforated suction area, passages traversing the surface of said area and connecting said perforations, and a pervious belt overlying said area to receive and retain a wrapper.

14. In a machine of the class described and in combination, a wrapping carrier having a perforated suction area, surface passages or grooves interconnecting said perforations, and a perforated belt overlying said area to receive and retain a wrapper.

15. In a machine of the class described and in combination, a revoluble wrapping drum having a plurality of perforated peripheral suction areas, means axially disposed with respect to said drum to exhaust an area when said drum has brought an area to wrapper receiving position, pervious wrapping belts overlying said areas to receive and retain a wrapper, and belt-manipulating instrumentalities to wrap a charge of tobacco and a suction-held wrapper into a cigarette.

16. In a machine of the class described and in combination, a revoluble wrapping drum having a plurality of perforated peripheral suction areas, means to exhaust an area when said drum has brought it to wrapper-receiving position, pervious wrapping belts overlying said areas to receive and retain a wrapper, and belt manipulating instrumentalities to wrap a charge of tobacco and a suction held wrapper into a cigarette.

17. In a machine of the class described and in combination, a wrapping drum having a plurality of peripheral suction areas, a revoluble support for said drum, a suction pipe axially disposed relative to said drum to exhaust an area when said drum has brought said area to wrapper-receiving position, perforated belts overlying said suction areas, and levers operable on rotation of said drum to wrap said belt about a charge of tobacco and a suction-held wrapper to form a cigarette.

18. In a machine of the class described and in combination, a revoluble wrapping drum having peripheral suction areas, radial suction passages communicating with said areas, means for exhausting said passages when a suction area is brought to wrapper-receiving position, pervious wrapping belts overlying said areas, and levers operable on rotation of said drum to wrap said belt about a charge of tobacco and a suction-held wrapper to form a cigarette.

19. In a machine of the class described and in combination, a revoluble wrapping drum having peripheral suction areas and suction passages leading thereto, a journal supporting one end of said drum, a hollow fixed journal supporting the other end of said drum and communicating with said passages, means for exhausting said fixed journal, wrapping belts overlying said suction areas, and levers operable on rotation of said drum to wrap said belt about a charge of tobacco and a suction held wrapper to form a cigarette.

20. In a machine of the class described and in combination, a revoluble wrapping drum having peripheral suction areas and suction passages leading thereto, wrapping belts overlying said areas, belt-manipulating levers to wrap a charge of tobacco and a suction-held wrapper into a cigarette, a rotatable journal supporting one end of said drum, and a hollow fixed journal connected with a suitable exhaust and supporting the other end of said drum and having communication at certain periods with said suction passages.

21. In a machine of the class described and in combination, a revoluble wrapping drum, means carried thereby to receive and retain a wrapper in flat condition, a wrapping belt to assemble and roll a charge of tobacco and said wrapper into a cigarette, a tobacco supply hopper pivoted in feeding relation to said wrapping instrumentalities, and charge forming and delivering devices carried by said hopper.

22. In a machine of the class described and in combination, a wrapping drum, a wrapping belt thereon to roll a charge of tobacco and a wrapper into a cigarette, a tobacco supply hopper pivotally mounted in proximity to said drum, a feed slide to deliver a charge of tobacco to a delivery chute, and a second slide to compress and advance the charge in the chute to the wrapping instrumentalities, and means for driving said drum and slides in timed relation.

23. In a machine of the class described and in combination, a wrapping drum, a wrapping-belt and belt-manipulating instrumentalities on said drum to roll a charge of tobacco and a wrapper into a cigarette, a tobacco supply hopper, means for removing a charge from the hopper, a charge-receiving bucket, means for moving said bucket to delivery position relative to the wrapping instrumentalities and discharging the tobacco, and means for driving said drum and said charge delivery devices in timed relation.

24. In a machine of the class described and in combination, a wrapping carrier, wrapping devices to roll a wrapper and a charge of tobacco into a cigarette, a tobacco supply hopper, means for removing a charge of tobacco from the hopper, a charge-receiving bucket, means for moving said bucket to delivery position relative to the wrapping instrumentalities, means for opening said bucket to discharge the tobacco, and means for driving said carrier and said charge delivery devices in timed relation.

25. In a machine of the class described and in combination, a wrapping carrier, wrapping devices to roll a wrapper and a charge of tobacco into a cigarette, a tobacco supply hopper, means for removing the charge of tobacco from the hopper, a charge-receiving bucket having normally closed members to retain the charge, means for moving said bucket to delivery position relative to the wrapping instrumentalities, means for opening said bucket and discharging the tobacco therefrom, and means for driving said carrier and said charge delivery devices in timed relation.

26. In a machine of the class described and in combination, a wrapping carrier, wrapping devices to roll a wrapper and a charge of tobacco into a cigarette, a tobacco supply hopper, means for removing a charge of tobacco from the hopper, a charge-receiving bucket comprising spring closed members to receive the charge of tobacco, means for moving said bucket to delivery position relative to the wrapping instrumentalities, means for forcing the charge of tobacco from said bucket to the wrapping devices, and means for driving said carrier and said charge delivery devices in timed relation.

27. In a machine of the class described and in combination, a wrapping carrier, wrapping devices to roll a wrapper and a charge of tobacco into a cigarette, a tobacco supply hopper, a slide for removing a charge of tobacco from said hopper, a charge receiving bucket comprising normally closed spring members, a second slide to compress said charge into said bucket, said second slide serving also to open said bucket and deliver the charge of tobacco to the wrapping devices, and means for driving said carrier and said charge delivery devices in timed relation.

28. In a machine of the class described and in combination, a wrapping carrier, wrapping devices to roll a wrapper and a charge of tobacco into a cigarette, a tobacco supply hopper, a horizontal slide to remove a charge of tobacco from said hopper, a charge-receiving chute having a normally closed bucket at its lower end, means for moving said chute and bucket downwardly to delivery position relative to the wrapping devices, a second slide to force the tobacco through said chute, open the bucket, and discharge the tobacco, and means for driving said carrier and said charge delivery devices in timed relation.

29. In a machine of the class described and in combination, a wrapping carrier, wrapping devices for rolling a wrapper and a charge of tobacco into a cigarette, a tobacco supply hopper, a slide to remove a charge of tobacco from said hopper, a movable charge-receiving chute having a spring closed bucket at its lower end, means for moving said chute and bucket to delivery position relative to the wrapping devices, a second slide movable in said chute to compress the charge of tobacco in said bucket, said slide having a continued movement to open the bucket and discharge the tobacco to the wrapping devices, and means for driving said carrier and said charge delivery devices in timed relation.

30. In a machine of the class described and in combination, a wrapping carrier, wrapping devices to roll a wrapper and a charge of tobacco into a cigarette, a tobacco supply hopper, means to remove a charge of tobacco from said hopper and deliver it to the said wrapping devices, and a guard plate movable relative to said delivery devices.

31. In a machine of the class described and in combination, a wrapping carrier, wrapping devices to roll a wrapper and a charge of tobacco into a cigarette, a tobacco supply hopper, means to remove a charge of tobacco from said hopper and deliver it to the said wrapping devices, and a guard plate movable in advance of said delivery devices.

32. In a machine of the class described and in combination, a wrapping carrier, wrapping devices to roll a wrapper and a charge of tobacco into a cigarette, a tobacco supply hopper, means to remove a charge of tobacco from said hopper and deliver it to the said wrapping devices, a fixed guard plate adjacent the path of movement of said delivery devices, and a second guard plate movable adjacent the path of movement and in advance of said delivery devices.

33. In a machine of the class described and in combination, a wrapping carrier, means for holding a wrapper and a charge of tobacco into a cigarette, and means for tucking said cigarette at a predetermined point in the movement of said carrier, said tucking means serving also to position said carrier.

34. In a machine of the class described and in combination, a wrapping carrier, means for rolling a wrapper and a charge of tobacco into a cigarette, and a tucking head movable at right angles to the path of movement of said carrier to tuck said cigarette, said tucking head serving also to position said carrier.

35. In a machine of the class described and in combination, a wrapping carrier, means for rolling a wrapper and a charge of tobacco into a cigarette, tucking heads movable at right angles to the path of movement of said carrier to tuck said cigarette, and seats on said carrier to receive the tucking heads and position said carrier.

36. In a machine of the class described and in combination, a wrapping carrier, means for rolling a wrapper and a charge of tobacco into a cigarette, tucking heads to engage said carrier, position it, and simultaneously initially tuck the cigarette, and means to complete the tucking operation.

37. In a machine of the class described and in combination, a wrapping carrier, means for rolling a wrapper and a charge of tobacco into a cigarette, tucking heads comprising a movable barrel to engage said carrier, position the same, and initially tuck the cigarette, and a tucking pin movable in said barrel to complete the tucking operation.

38. In a machine of the class described and in combination, a wrapping carrier, means for rolling a wrapper and a charge of tobacco into a cigarette, a tucking head comprising a movable barrel having a coned tip to engage said carrier and cigarette, position said carrier, and initially tuck the cigarette, and a tucking pin movable through said barrel to engage the initially tucked cigarette end and complete the tucking operation.

39. In a machine of the class described and in combination, a wrapping carrier, means for rolling a wrapper and a charge of tobacco into a cigarette, a tucking head comprising a carrier-positioning and cigarette-tucking barrel, and a tuck completing pin movable relative to said barrel.

40. In a machine of the class described and in combination, a wrapping carrier, means for rolling a wrapper and a charge of tobacco into a cigarette, a tucking head comprising a carrier-positioning and cigarette-tucking barrel, a relatively movable tuck-completing pin, and a spring to normally hold said barrel and pin extended.

41. In a machine of the class described and in combination, a wrapping carrier, means for rolling a wrapper and a charge of tobacco into a cigarette, a tucking head comprising a carrier-positioning and cigarette-tucking barrel, a tuck-completing pin telescoping with said barrel, and a spring between said barrel and pin to hold them normally extended.

42. In a machine of the class described and in combination, a wrapping carrier, means for rolling a wrapper and a charge of tobacco into a cigarette, a cigarette retaining arm to hold a rolled cigarette in position for tucking at a predetermined point in the travel of said carrier, and tucking heads adjacent said carrier to engage and position said carrier and tuck said cigarette.

43. In a machine of the class described, and in combination, a traveling wrapping carrier having a suction area, a pervious wrapper-receiving and retaining belt overlapping said suction area and moving with said carrier, belt manipulating instrumentalities operative to roll a suction-held wrapper and a charge of tobacco into a cigarette as the carrier travels, and means for automatically cutting off suction from the suction area at a suitable point in said travel.

44. In a machine of the class described, and in combination, a plurality of wrapping carriers each having a suction area and traveling about a common axis, a pervious wrapper-receiving and retaining belt overlying the suction area of each of said carriers and movable therewith, belt manipulating instrumentalities on each carrier operative to roll a suction-held wrapper and a charge of tobacco into a cigarette as the carrier travels, and means for automatically cutting off suction from each suction area successively at a suitable point as said carriers rotate about the common axis.

In testimony whereof we have hereunto set our hands in the presence of two subscribing witnesses.

BERNHARD T. BURCHARDI.
BENJAMIN E. TEALE.

Witnesses:
J. GRANVILLO MEYERS,
L. A. HAMMERSLEY.

Copies of this patent may be obtained for five cents each, by addressing the "Commissioner of Patents, Washington, D. C."